(12) United States Patent
Liou et al.

(10) Patent No.: US 9,447,576 B2
(45) Date of Patent: Sep. 20, 2016

(54) POST BOND PERFORATION OF A SEPTUM IN AN ACOUSTIC PANEL

(71) Applicant: Rohr, Inc., Chula Vista, CA (US)

(72) Inventors: Rueichang Richard Liou, La Jolla, CA (US); Sean Tiwari, Glendora, CA (US); Song Chiou, Irvine, CA (US); Dustin Cross, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/593,664

(22) Filed: Jan. 9, 2015

(65) Prior Publication Data

US 2016/0201317 A1    Jul. 14, 2016

(51) Int. Cl.
*E04B 1/86* (2006.01)
*E04B 1/82* (2006.01)

(52) U.S. Cl.
CPC .................. *E04B 1/8209* (2013.01)

(58) Field of Classification Search
CPC ........................................ E04B 1/86
USPC .......................... 181/290, 284, 286; 264/156
See application file for complete search history.

(56) References Cited

U.S. PATENT DOCUMENTS

| | | | | |
|---|---|---|---|---|
| 4,257,998 A | * | 3/1981 | Diepenbrock et al. | 264/156 |
| 4,816,097 A | * | 3/1989 | Williams et al. | 156/247 |
| 5,997,985 A | * | 12/1999 | Clarke et al. | 428/116 |
| 8,047,329 B1 | | 11/2011 | Douglas et al. | |
| 8,397,865 B2 | | 3/2013 | Douglas et al. | |
| 8,820,477 B1 | * | 9/2014 | Herrera et al. | 181/292 |
| 8,979,014 B2 | * | 3/2015 | Boock et al. | 244/1 N |
| 2002/0036115 A1 | * | 3/2002 | Wilson | 181/292 |
| 2004/0163888 A1 | | 8/2004 | Johnson | |
| 2009/0045009 A1 | * | 2/2009 | Chiou et al. | 181/290 |
| 2010/0187039 A1 | * | 7/2010 | Holmgren | 181/284 |
| 2014/0248116 A1 | | 9/2014 | Ali | |
| 2015/0306815 A1 | * | 10/2015 | Braden et al. | 264/400 |

FOREIGN PATENT DOCUMENTS

GB    2486120 A    6/2012

OTHER PUBLICATIONS

EP search report for EP16150778.5 dated May 13, 2016.

* cited by examiner

*Primary Examiner* — Forrest M Phillips
(74) *Attorney, Agent, or Firm* — O'Shea Getz P.C.

(57) ABSTRACT

Acoustic panels and methods for manufacturing acoustic panels are provided. In one such method, a core structure is provided between and bonded to a top skin and a septum. A plurality of perforations are formed in the top skin using an energy beam device. A plurality of perforations are formed in the septum through the top skin holes using the energy beam device. A plurality of cavities in the core structure fluidly couple at least some of the perforations in the top skin with at least some of the perforations in the septum.

19 Claims, 8 Drawing Sheets

POST BOND PERFORATION OF A SEPTUM IN AN ACOUSTIC PANEL

BACKGROUND

1. Technical Field

This disclosure relates generally to acoustic panels and manufacturing methods thereof.

2. Background Information

Various types and configurations of acoustic panels are known in the art for applications such as aircraft nacelles and include single degree of freedom (SDoF) acoustic panels and double (or dual) degree of freedom (DDoF) acoustic panels.

A SDoF acoustic panel may include a core material such as honeycomb core bonded between a pair of exterior panel skins, typically referred to as a top skin (which faces the noise source to be attenuated) and a bottom skin. The top skin is perforated to allow noise waves into cavities formed by the core for attenuation. Each cavity formed by the core is a resonating chamber and reflects back out of the top skin perforations a corresponding sound wave which is intended to be out of phase with the incoming sound wave so that they destructively interfere. Such a SDoF acoustic panel is effective in attenuating only a specific target noise frequency, or a limited, narrow band of frequencies around the target frequency.

A DDoF acoustic panel is distinguished from a SDoF acoustic panel in that the DDoF acoustic panel has a different core structure which forms two different resonating chambers to attenuate noise around two target frequency bands for broader band noise attenuation. One type of DDoF acoustic panel is essentially a SDoF acoustic panel with an additional skin called a septum positioned between and generally parallel to the top skin and back skin to divide the cavity formed by the core walls, top skin and back skin into two distinct cavities. The septum is perforated so that sound waves can enter through the perforations in the top skin, travel through the first cavity, through the perforations in the septum, and into the second cavity. The target frequencies, which are essentially the resonant frequencies of the two cavities or resonating chambers, are a function of the cavity geometry and other factors, and is typically adjusted by selecting the overall depth between the top skin and back skin, and the depth of the septum.

Two examples of DDoF acoustic panels are shown in FIGS. 1 and 2. In FIG. 1, the DDoF panel is formed by a single core structure extending continuously between the top skin and bottom skin, and discrete septums are individually placed in the cavities formed by the core. In FIG. 2, the DDoF panel is formed by two independent layers of core structure, with a continuous septum layer separating them. Here, the two independent layers of core structure are not necessarily aligned or registered with one another such that the cavities fainted in each layer may overlap to at least some extent. In each case, the core structure is typically bonded with an adhesive at each joint it forms with the top skin, bottom skin and septum.

In the case of a DDoF acoustic panel constructed in the manner shown in FIG. 1, the septum is typically constructed of a wire mesh or tight screen made of metal or plastic, and the discrete septum pieces are individually bonded in place inside of each cavity formed by the core. The manufacturing costs for this style of construction can be very high, based in part on the difficulty of shaping and positioning the many small, discrete pieces of septum in each cavity.

In the case of a DDoF acoustic panel constructed in the manner shown in FIG. 2, the septum may be constructed from a continuous sheet of wire mesh material or a tight screen made of metal or plastic, or a solid metal or plastic skin with discrete perforations formed therein, or other configurations, but must be permeable in some fashion so that the air waves can travel through. With such a configuration, the bonding strength between walls of the first and the second core structures and the septum may be relatively weak since portions of the walls overlap pores or perforations in the septum, reducing the bonding strength. Also, if using an adhesive bonding process to connect the two core structures to the septum, care must be taken to avoid the adhesive wicking onto the septum and closing the pores or perforations.

There is a need in the art for improved acoustic panels and method for manufacturing such improved acoustic panels.

SUMMARY OF THE DISCLOSURE

According to an aspect of the invention, a method is provided for manufacturing an acoustic panel. This method includes providing a core structure between and bonded to a top skin and a septum. A plurality of perforations are formed in the top skin using an energy beam device. A plurality of perforations are formed in the septum using the energy beam device. A plurality of cavities in the core structure fluidly couple at least some of the perforations in the top skin with at least some of the perforations in the septum.

According to another aspect of the invention, another method is provided for manufacturing an acoustic panel. This method includes arranging and bonding a top skin, a septum, and a core structure together, where a cavity extends within the core structure between the top skin and the septum. A first perforation is cut in the top skin using an energy beam. A second perforation is cut in the septum using an energy beam which projects through the first perforation.

According to still another aspect of the invention, an acoustic panel is provided that includes a top skin, a septum, a bottom skin, and one or more core structures. The one or more core structures define a first cavity between the top skin and the septum, and a second cavity between the septum and the bottom skin. A plurality of perforations are formed in the top skin. A plurality of perforations are formed in the septum such that the first and the second cavities are in fluid communication with one another. The septum is bonded to walls of the one or more core structures along a non-perforated portion of the septum.

The septum is at least partially coated with bonding material and at least one of the perforations in the septum extends through the bonding material.

The forming of the perforations in the top skin may include directing an energy beam from the energy beam device onto the top skin to form a first perforation in the top skin. The forming of the perforations in the septum may include directing an energy beam from the energy beam device through the first perforation and onto the septum to form a second perforation in the septum.

A focal length of the energy beam that forms the first perforation may be shorter than a focal length of the energy beam that forms the second perforation.

A power of the energy beam that forms the first perforation may be different than a power of the energy beam that forms the second perforation.

A quantity of the perforations in the top skin may be equal to a quantity of the perforations in the septum.

A quantity of the perforations in the top skin may be different than a quantity of the perforations in the septum.

The providing may also include providing a second core structure between and bonded to the septum and a bottom skin. At least some of the perforations in the septum may fluidly couple at least some of the cavities in the core structure with a plurality of cavities in the second core structure.

The energy beam may be a laser beam and may be generated by a laser.

A second core structure may be arranged and bonded between the septum and a bottom skin, where a second cavity extends within the second core structure between the septum and the bottom skin. This arranging and bonding may occur before or after the forming/cutting of the perforations. The second perforation may fluidly couple the cavity with the second cavity.

The foregoing features and the operation of the invention will become more apparent in light of the following description and the accompanying drawings.

DETAILED DESCRIPTION

Figure 1:
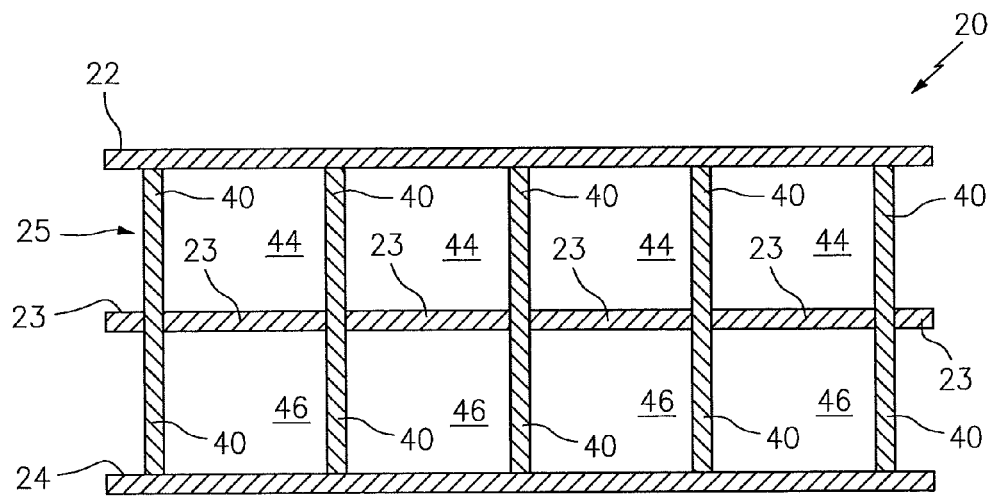
FIGS. 1 and 2 are sectional schematic illustrations of a portion of exemplary embodiments of prior art acoustic panels.
Figure 2:
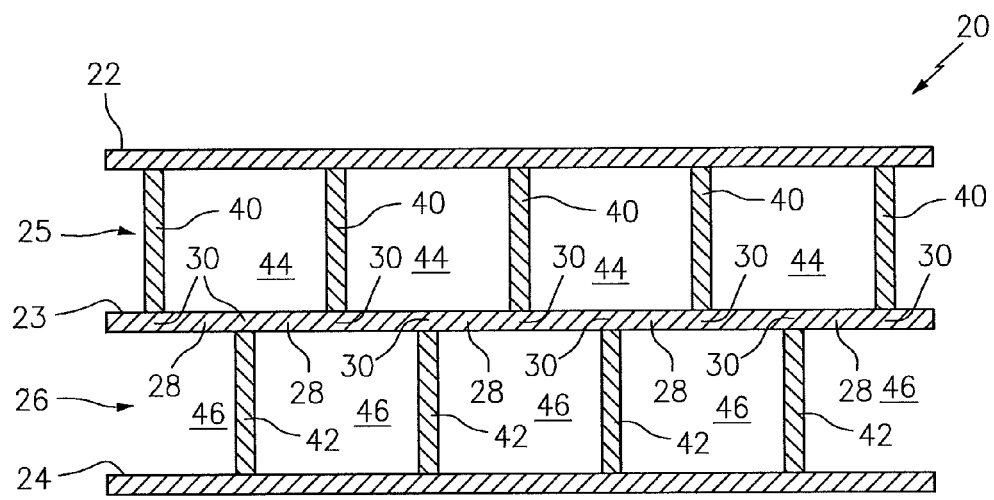

FIGS. 1 and 2 illustrate exemplary embodiments or construction options of a DDoF acoustic panel 20. Some features of this acoustic panel 20, such as perforations or pores in the top skin and septum, are not shown in FIGS. 1 and 2 for ease of illustration. Some of such features, however, are described in detail below with reference to other drawings.

The acoustic panel 20 may be configured to attenuate certain noise frequency(ies) or frequency band(s) generated by a gas turbine engine on an aircraft or any other type of noise generating device. The acoustic panel 20 can also serve as structure to help define aerodynamic surfaces and other structures on an aircraft. This acoustic panel 20 includes a top (or front) skin 22, a septum 23 and a bottom (or back) skin 24. Two examples of DDoF acoustic panels are shown in FIGS. 1 and 2.

In FIG. 1, the DDoF panel 20 is formed with a single core structure 25, or core, having walls 40 generally normal to the top skin 22 and bottom skin 24. The core structure 25 extends continuously between the top skin 22 and bottom skin 24. Discrete septums 28 are individually placed inside the core structure 25 to define therein cavities 44 and 46.

In FIG. 2, the DDoF panel 20 is formed by two independent layers of core structure 25, 26, or core, with a continuous septum layer 23 separating them. The two independent layers of core structure 25, 26 are not necessarily aligned or registered with one another such that the cavities formed in each layer may overlap to at least some extent; of course, the core structures 25 and 26 may alternatively be aligned. The core structures 25, 26 have separate walls 40, 42 that are generally normal to the top skin 22 and bottom skin 24, and extend between the top skin 22 and the septum 23 and between the septum 23 and the bottom skin 24, respectively.

In each panel 20 described above, the core structure 25, 26 is typically bonded with an adhesive at each joint its walls 40, 42 form with the top skin 22, bottom skin 24 and septum 23, although in some cases a mechanical fastening, welding or brazing might also be used. In the case of a DDoF acoustic panel 20 constructed in the manner shown in FIG. 1, the septums 23 are typically constructed of a wire mesh or tight screen made of metal or plastic, and the discreet septum 23 pieces are individually bonded or mechanically locked in place inside of each cavity formed by the core structure 25. The core structures 25, 26 may form honeycomb-shaped cavities 44, 46, or any other shape may be used according to the needs of the application. The top skin 22 and the septum 23 are perforated or porous to permit sound waves to travel through. For convenience throughout the remainder of this specification, the septum(s) 23 will be referred to generically and could be a septum either as shown in FIG. 1 or 2, or could be a septum or septums formed according to other known embodiments. Likewise, the core structure and core walls will be referred to generically and could be a core structure and core walls either as shown in FIG. 1 or 2, or could be a core or core wells formed according to other known embodiments. It will be apparent to those of skill in this art that the construction and manufacturing techniques or principles disclosed herein will be applicable to many varieties of DDoF or other types of acoustic panels.

Each of the skins 22 and 24 and septum(s) 23 may be constructed from plastics or composites (such as fiber reinforced thermosets or thermoplastic matrices), or metals such as aluminum, titanium, Inconel, copper, etc. The top skin 22 could be a perforated sheet or a porous or mesh material.

According to the present manufacturing technique, in a first step the top skin 22, core 40 (and 42, as applicable), septum(s) 23, and bottom skin 24 are bonded together to form a generally rigid panel, as is known in this art. Then a perforation technique, described more fully below, is used to form perforations in the top skin 22 and septum 23. This results is the septum(s) 23 having perforated regions 28 and non-perforated regions 30 (e.g., see FIG. 2) to which the respective walls 40, 42 of core structures 25 and 26 are bonded for a strong and reliable bond joint. As illustrated in FIGS. 3-6, the top skin 22 includes a plurality of first perforations 32 and the perforated regions 28 of the septum 23 include a plurality of second perforations 34. The perforations 32, 34 can be any size or shape (e.g., round, oval, tear drop-shaped) as desired for the particular application.

Referring to FIGS. 1-6, one or more of the cavities 44 may each fluidly couple one or more of the first perforations 32 with one or more of the second perforations 34. One or more of the cavities 46 may each be fluidly coupled with one or more of the second perforations 34 and, thus, one or more respective cavities 44.

Figure 3:
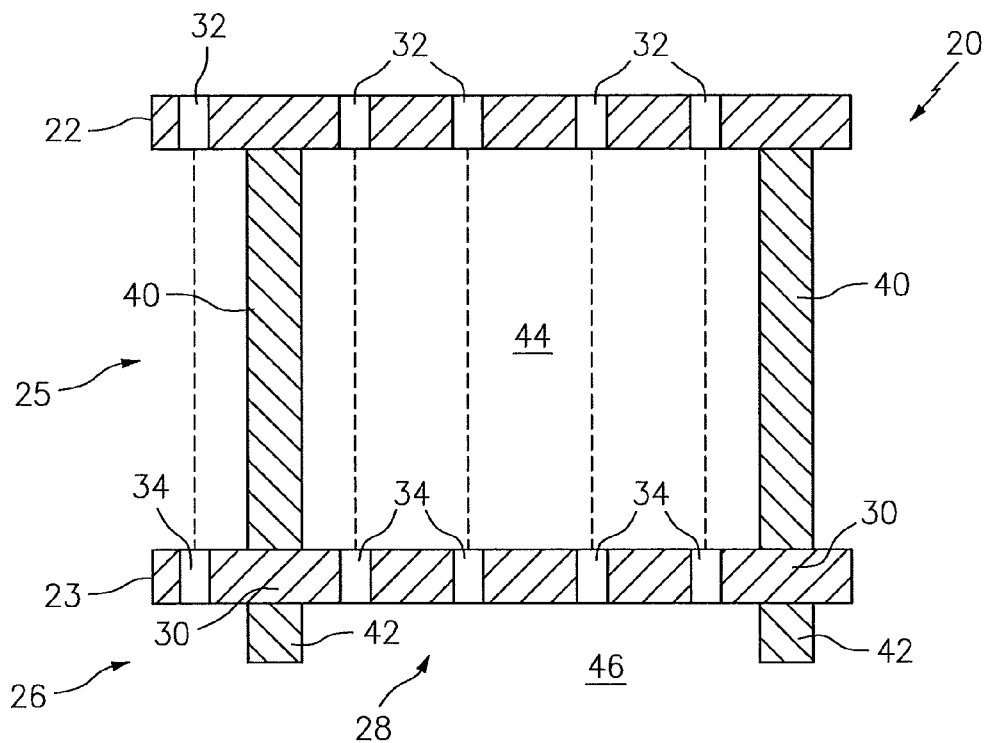
FIGS. 3-6 are partial sectional illustrations of various embodiments of an acoustic panel.

Referring to FIG. 3, one or more of the first perforations 32 may each be substantially laterally aligned with a respective one of the second perforations 34. In addition or alternatively, referring now to FIG. 4, one or more of the first perforations 32 may each be laterally misaligned with a respective one of the second perforations 34. For example, the closest second perforation 34 to a respective first perforation 32 may be laterally offset from that first perforation 32.

Figure 4:
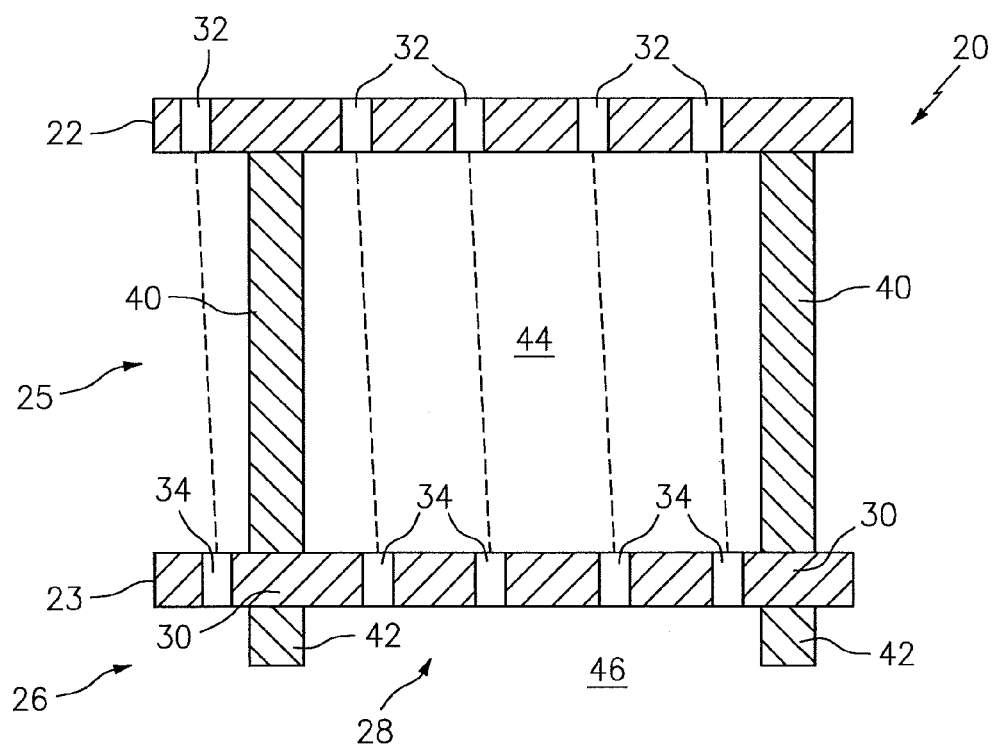
Figure 5:
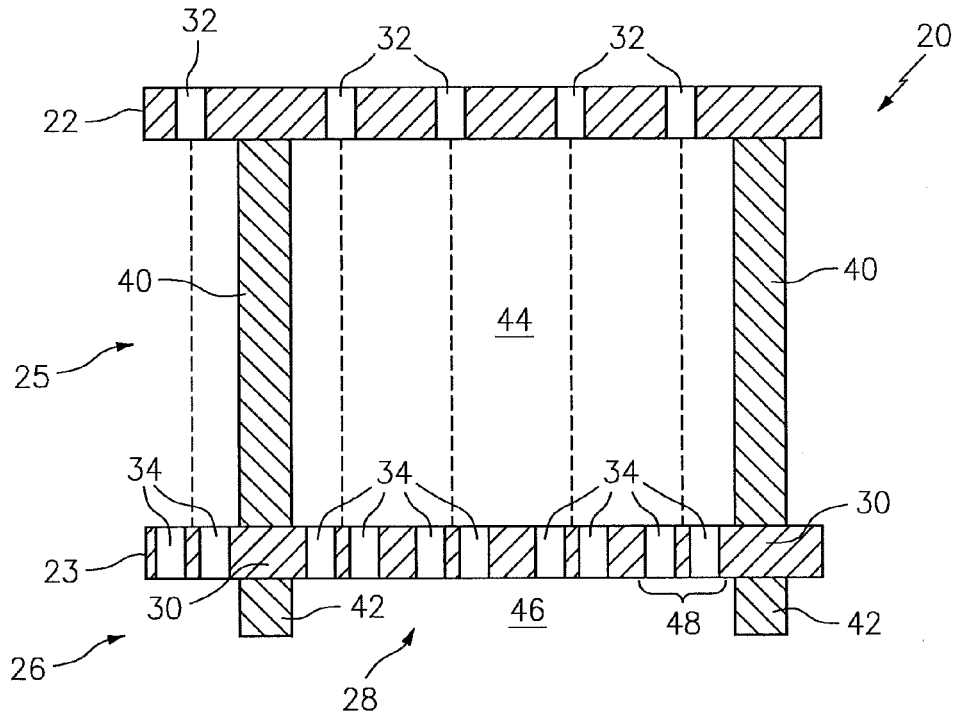
Figure 6:
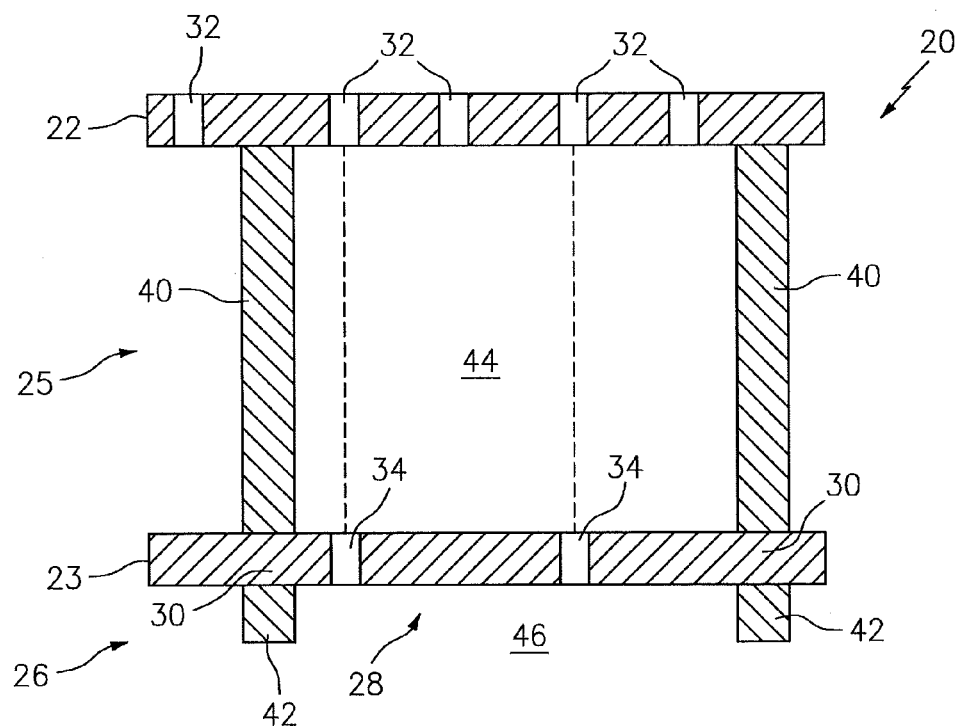

Referring to FIG. 5, one or more of the first perforations 32 may each be laterally aligned with a grouping 48 of the second perforations 34. For example, each first perforation 32 may be laterally centered between a close grouping 48 of the second perforations 34 where these second perforations 34 are closer to the respective first perforation 32 than other adjacent first perforations 32. With this configuration, a quantity of the first perforations 32 included in the top skin 22 may be less than a quantity of the second perforations 34 included in the septum 23. Of course, in other embodiments, the quantity of the first perforations 32 included in the top skin 22 may be substantially equal to the quantity of the second perforations 34 included in the septum 23 as shown in FIGS. 3 and 4. In still other embodiments, the quantity of the first perforations 32 included in the top skin 22 may be greater than the quantity of the second perforations 34 included in the septum 23 as shown in FIG. 6.

Figure 7:
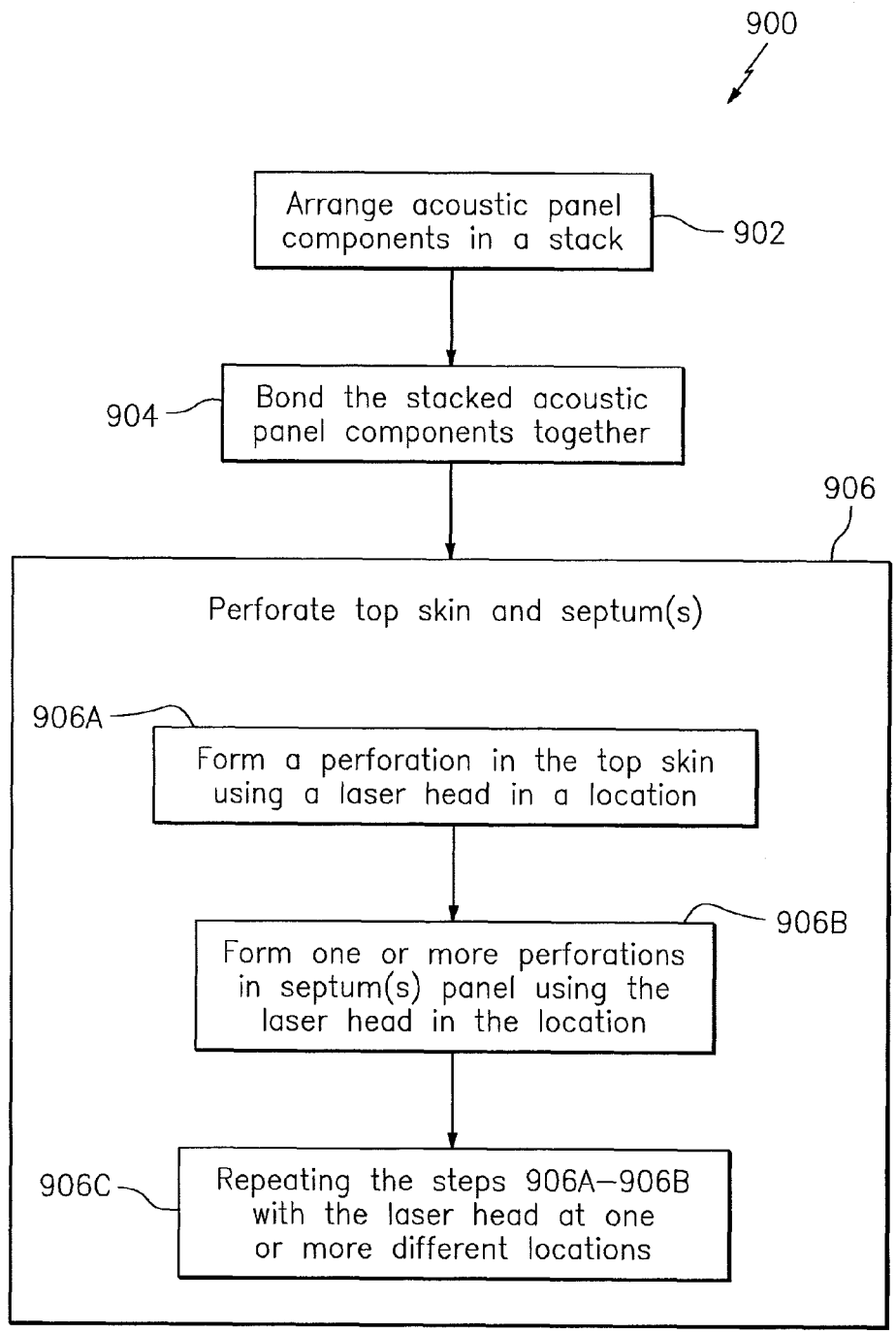
FIG. 7 is a flow diagram of a method for manufacturing an acoustic panel.

FIG. 7 is a generalized flow diagram of a method 900 for manufacturing an acoustic panel such as the acoustic panel 20 embodiments illustrated in FIGS. 1-6. In step 902, the acoustic panel components 22-26 are arranged into a stack. It is worth noting, in step 902, the top skin 22 and septum 23 are non-perforated; e.g., the first and the second perforations 32, 34 have not yet been formed. Also, it may be possible to include in the stack and the subsequent bonding step only the top skin 22, the septum 23, and the core structure 25. The core structure 26 (as applicable) and the bottom skin 24 may be potentially assembled later.

Figure 8:
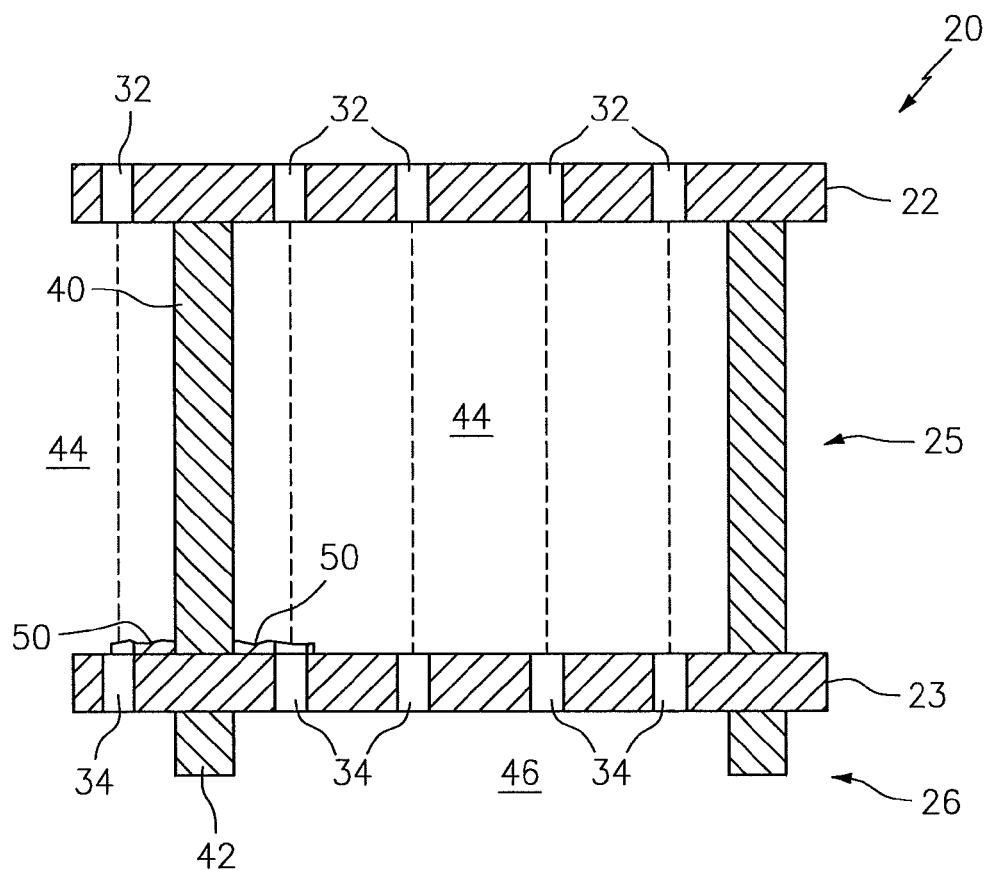
FIG. 8 is partial sectional illustration of another embodiment of an acoustic panel.

In step 904, the stacked acoustic panel components 22-26 are bonded together. It is worth noting, depending upon the particular bonding process used, some bonding material 50 (e.g., adhesive) may coat portion(s) of the septum 23 adjacent the core cell walls 40 of the first core structure 25 and/or the core cell walls 42 of the second core structure 26 (see FIG. 8).

In step 906, the top skin 22 and septum 23 are perforated. First, the first perforations 32 are formed in the top skin 22 using a laser or other directed beam of energy 52 (see FIG. 9). For convenience, the term "laser" and derivations thereof will be used throughout the remainder of this application to mean a laser beam or other directed beam of energy (for example, an electron beam) which can perforate or cut the top skin 22 and the septum(s) 23. The second perforations 34 are then formed in the septum 23 also using the laser 52 by directing the laser beam 56 through one or more of the first perforations 32 (see FIG. 10).

Figure 9:
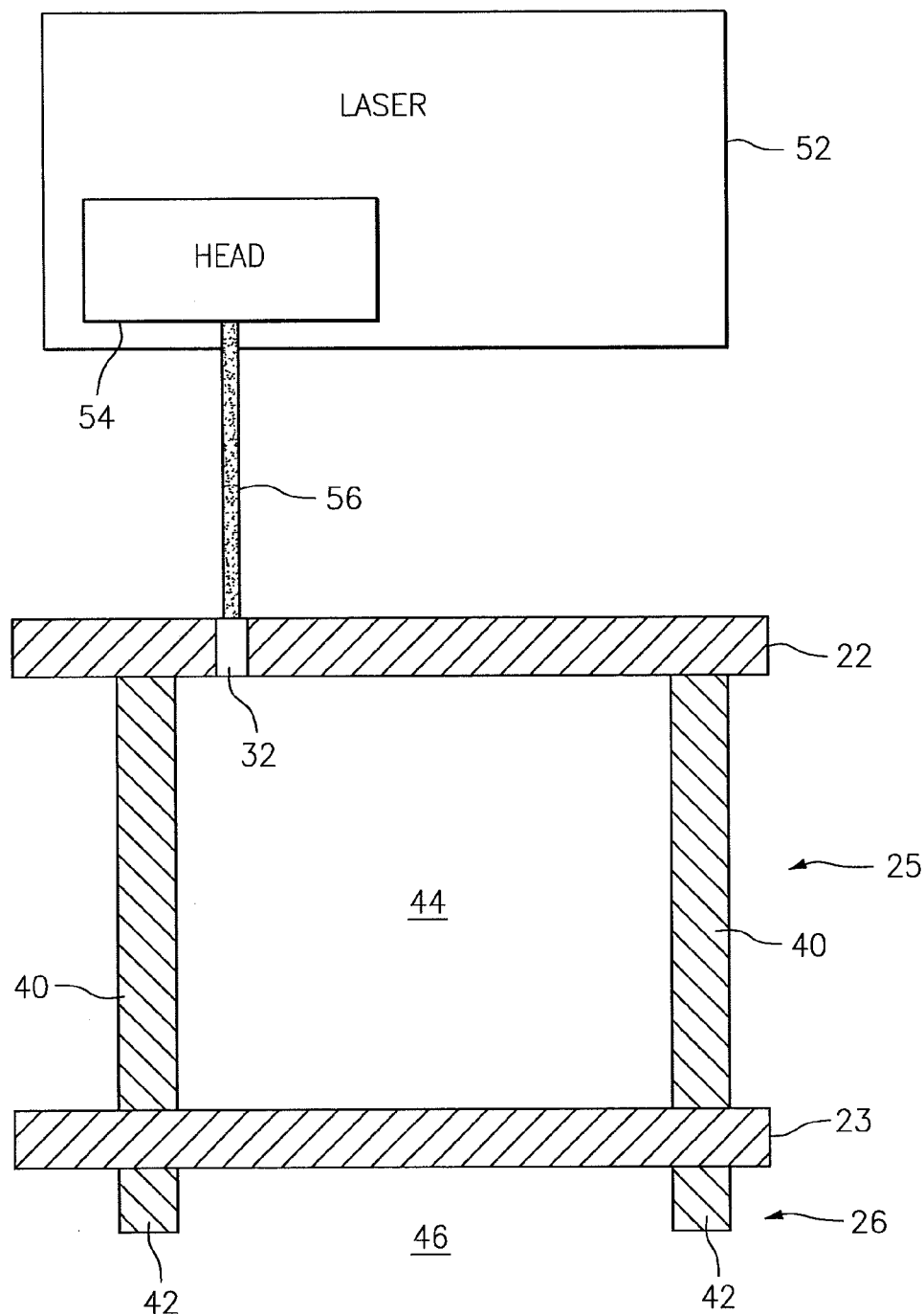
FIG. 9 is schematic illustration of a laser forming a first perforation in a top skin of an acoustic panel.

In step 906A, referring to FIG. 9, a head 54 of the laser 52 may be moved to a first location relative to the stacked components 22-26. The laser 52 may be programmed or otherwise configured with a first focal length, which may be approximately equal to a distance between the laser head 54 and the top skin 22. The laser 52 may also be programmed or otherwise configured with a first power. The laser 52 may subsequently be signaled to direct a laser beam 56 with the first focal length and the first power onto the top skin 22 to form an aperture (e.g., one of the first perforations 32).

Figure 10:
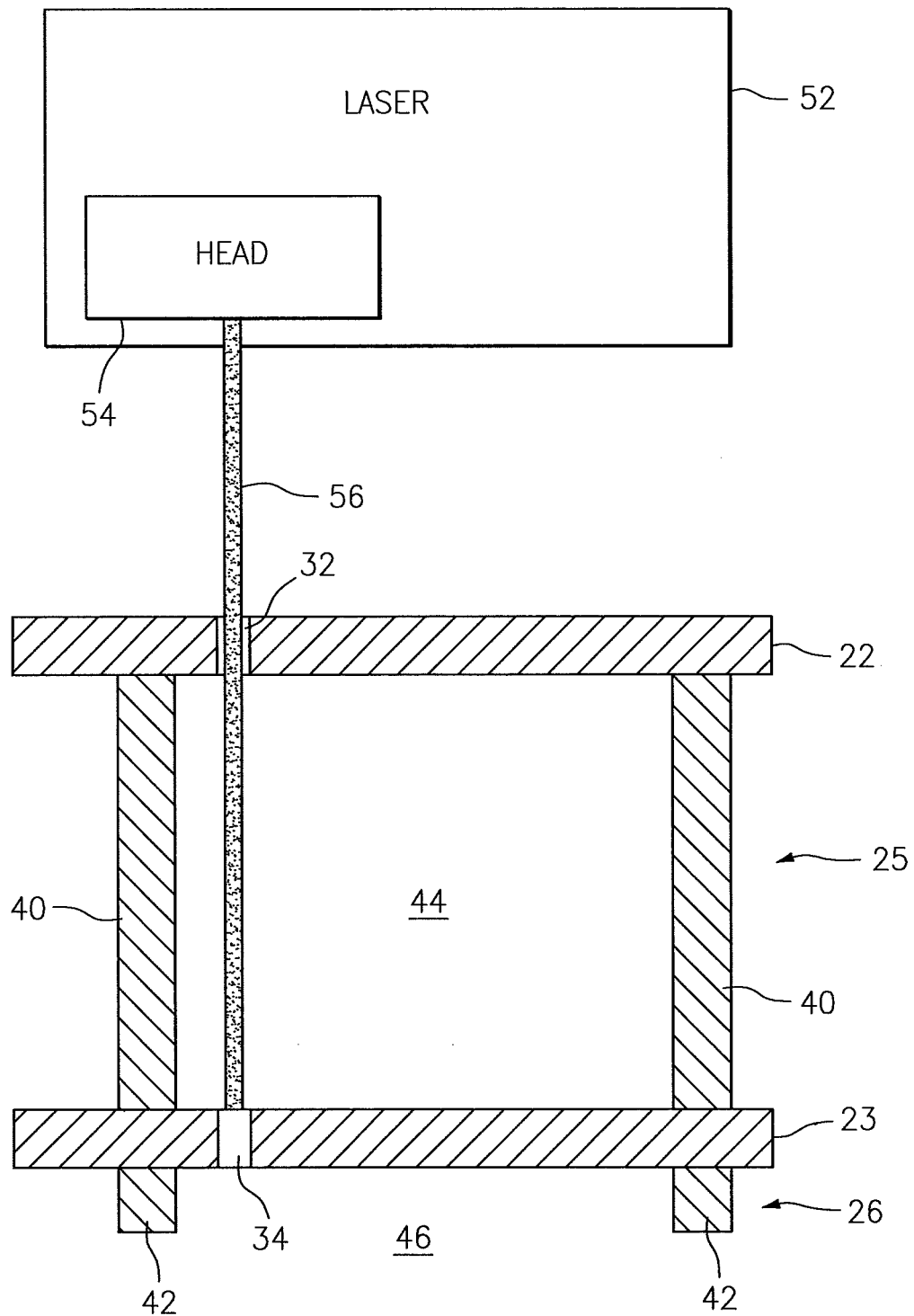
FIG. 10 is a schematic illustration of the laser forming a second perforation in a septum of an acoustic panel.

In step 906B, referring now to FIG. 10, subsequent to forming at least some of the first perforations 32 and with the laser head 54 still substantially in the first location, the laser 52 may be reprogrammed or otherwise configured with a second focal length. This second focal length may be approximately equal to a distance between the laser head 54 and the septum 23 and, thus, greater than the first focal length. The laser 52 may also be programmed or otherwise configured with a second power, which may be substantially equal to or different than (e.g., greater or less than) the first power. The laser 52 may subsequently be signaled to direct a laser beam 56 with the second focal length and the second power onto the septum 23. This laser beam 56 may form an aperture (e.g., one of the second perforations 34) through the septum 23. By maintaining the position of the laser head 54 after forming the first perforations 32, the laser head is assured of its relative position with respect to the first perforations 32 and can reliably direct the laser beam 56 through them. However, maintaining the laser head 54 in its position while forming both sets of perforations 32 and 34 may not be necessary.

By tailoring the first focal length and the first power in the step 906A, the laser beam 56 can be tailored to reduce or prevent damage to the septum 23 or other components (e.g., the core 25) of the acoustic panel 20 while the first perforations 32 are formed. For example, the laser beam 56 may be tailored such that if it is directed onto the septum 23 while at its first focal length and first power, the beam 56 may simply reflect off of or be absorbed by the septum 23 without forming any feature (e.g., recesses, holes, cracks, etc.) or damage therein. Similarly, by tailoring the second focal length and the second power in the step 906B, the laser beam 56 can be tailored to reduce or prevent damage to the bottom skin 24 or other components (e.g., the core 26) of the acoustic panel 20.

Figure 11:
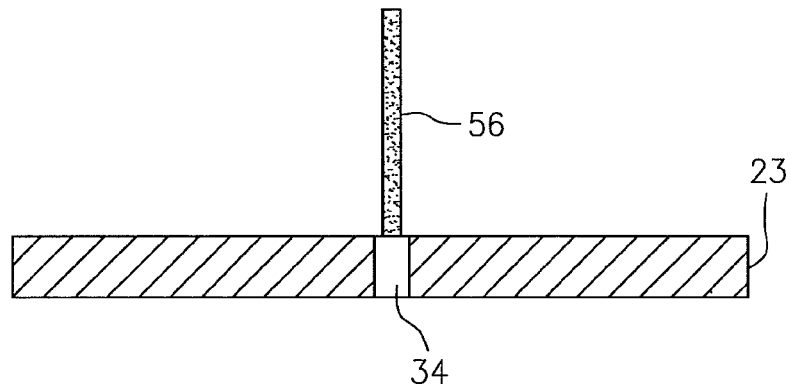
FIGS. 11-13 are schematic illustrations of a laser beam impacting a septum of the acoustic panel during formation of a respective second perforation at different angles of incidence.
Figure 12:
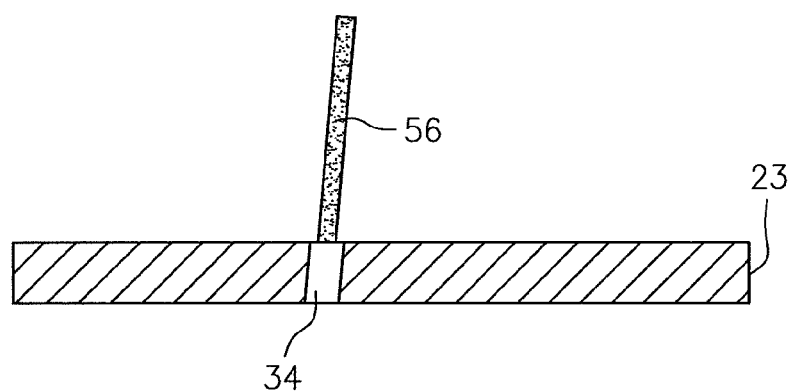
Figure 13:
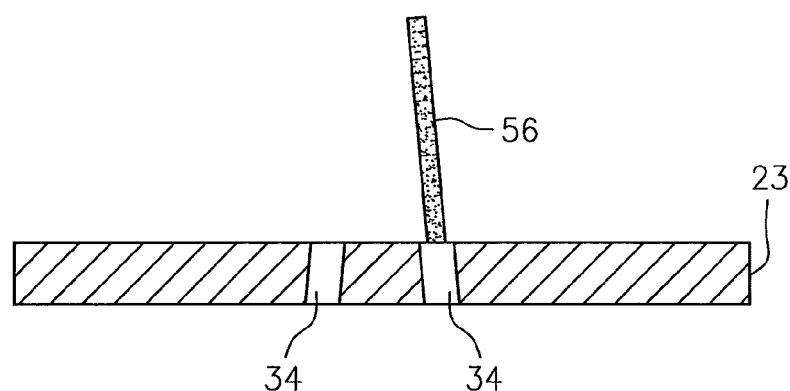

In some embodiments, the laser beam 56 may be directed from the laser head 54 onto the septum 23 with a substantially zero angle of incidence as shown in FIG. 11. In other embodiments, the laser beam 56 may be directed from the laser head 54 onto the septum 23 with a non-zero angle of incidence as shown in FIG. 12. In this manner, the second perforation 34 may be slightly laterally offset from or misaligned with the first perforation 32. Furthermore, by subsequently changing the angle of incidence, an additional second perforation 34 may be formed by directing another laser beam 56 through the first perforation 32 as shown in FIG. 13. Of course, formation of such an additional second perforation 34 may also require a slight lateral adjustment of the laser head 54 before and/or after the formation of each of the second perforations 34.

In step 906C, subsequent to the forming of the second perforation(s) 34 in the step 906B, the laser head 54 may be moved laterally to another location. Then the steps 906A and 906B may be repeated to form another set of first and second perforations 32 and 34. This step 906C may be repeated as many times as necessary to form all of the first and the second perforations 32 and 34.

Of course, in other embodiments, a plurality of the first perforations 32 may be formed. Thereafter, a plurality of the second perforations 34 may be formed. In such embodiments, the specific location of the laser head 54 during the formation of the first perforations 32 may be tracked such that the laser head 54 may be moved back to those locations during the formation of the second perforations 34. In addition or alternatively, imaging processes may be used to find and/or verify the locations of the first perforations 32 and thereafter move the laser head 54 accordingly. For example, stereo infrared (IR) thermography, x-ray scanning or any other suitable imaging/scanning technique may be used to determine the locations of the walls 40 beneath the top skin 22, or centroids of the cavities 44 beneath the top skin 22. These locations may be mapped relative to the panel 20 and/or the top skin 22 such that the second perforations 34 may be formed in the septum 23 without damaging the walls 40 and/or the bond between the walls and the top skin 22.

The portion 30 of the septum 23 bonded with the first and the second core structures 25 and 26 may be non-perforated since the core cell walls 40 of the first core structure 25 block the laser beam 56 from being directed thereon. As a result, the bond between the septum 23 and the first and the second core structures 25 and 26 is stronger because there is more material contact and bonding between the acoustic panel components 22, 23 and 25. It is also worth noting, because the perforation may be performed subsequent to the bonding, one or more of the second perforations 34 may extend through a portion of the bonding material 50 adjacent the core cell walls 40, 42 (see FIG. 8) and thereby reduce or eliminate the possibility of bonding material plugging or otherwise interfering with one or more of the perforations 34.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A method for manufacturing an acoustic panel, the method comprising:
   providing a core structure between and bonded to a top skin and a septum;
   forming a plurality of perforations in the top skin using an energy beam device; and
   forming a plurality of perforations in the septum using the energy beam device;
   wherein a plurality of cavities in the core structure fluidly couple at least some of the perforations in the top skin with at least some of the perforations in the septum.

2. The method of claim 1, wherein the top skin comprises a fiber-reinforced composite.

3. The method of claim 1, wherein the septum comprises a fiber-reinforced composite.

4. The method of claim 1, wherein the top skin and the septum are constructed from a same material.

5. The method of claim 1, wherein
   the forming of the perforations in the top skin comprises directing an energy beam from the energy beam device onto the top skin to form a first perforation in the top skin; and
   the forming of the perforations in the septum comprises directing an energy beam from the energy beam device through the first perforation and onto the septum to form a second perforation in the septum.

6. The method of claim 5, wherein a focal length of the energy beam that forms the first perforation is shorter than a focal length of the energy beam that forms the second perforation.

7. The method of claim 5, wherein a power of the energy beam that forms the first perforation is different than a power of the energy beam that forms the second perforation.

8. The method of claim 1, wherein a quantity of the perforations in the top skin is equal to a quantity of the perforations in the septum.

9. The method of claim 1, wherein a quantity of the perforations in the top skin is different than a quantity of the perforations in the septum.

10. The method of claim 1, wherein
    the providing further comprises providing a second core structure between and bonded to the septum and a bottom skin; and
    at least some of the perforations in the septum fluidly couple at least some of the cavities in the core structure with a plurality of cavities in the second core structure.

11. An acoustic panel, comprising:
    a top skin, a septum, a bottom skin, and one or more core structures, which define a first cavity between the top skin and the septum, and a second cavity between the septum and the bottom skin;
    a plurality of perforations formed in the top skin; and
    a plurality of perforations formed in the septum such that the first and the second cavities are in fluid communication with one another;
    wherein the septum is bonded to walls of the one or more core structures along a non-perforated portion of the septum, and wherein the septum comprises a fiber-reinforced composite.

12. The acoustic panel of claim 11, wherein the septum is at least partially coated with bonding material and at least one of the perforations in the septum extends through the bonding material.

13. A method for manufacturing an acoustic panel, the method comprising:
    arranging and bonding a top skin, a septum, and a core structure together, wherein a cavity extends within the core structure between the top skin and the septum;
    cutting a first perforation in the top skin using an energy beam; and
    cutting a second perforation in the septum using an energy beam which projects through the first perforation.

14. The method of claim 13, wherein the energy beam comprises a laser beam and is generated by a laser.

15. The method of claim 13, wherein a focal length of the energy beam that forms the first perforation is shorter than a focal length of the energy beam that forms the second perforation.

16. The method of claim 13, wherein a power of the energy beam that foil is the first perforation is different than a power of the energy beam that forms the second perforation.

17. The method of claim 13, wherein a quantity of the perforations in the top skin is equal to a quantity of the perforations in the septum.

18. The method of claim 13, further comprising:
    arranging and bonding a second core structure between the septum and a bottom skin, wherein a second cavity extends within the second core structure between the septum and the bottom skin;
    wherein the second perforation fluidly couples the cavity with the second cavity.

19. The method of claim 13, wherein the top skin comprises a fiber-reinforced composite.

* * * * *